(12) United States Patent
McCune, Jr.

(10) Patent No.: US 9,565,726 B2
(45) Date of Patent: Feb. 7, 2017

(54) POWER CONVERSION AND CONTROL SYSTEMS AND METHODS FOR SOLID-STATE LIGHTING

(71) Applicant: Earl W. McCune, Jr., Santa Clara, CA (US)

(72) Inventor: Earl W. McCune, Jr., Santa Clara, CA (US)

( * ) Notice: Subject to any disclaimer, the term of this patent is extended or adjusted under 35 U.S.C. 154(b) by 245 days.

(21) Appl. No.: 14/273,484

(22) Filed: May 8, 2014

(65) Prior Publication Data

US 2014/0239833 A1 Aug. 28, 2014

Related U.S. Application Data

(63) Continuation of application No. 12/897,066, filed on Oct. 4, 2010, now Pat. No. 8,760,078.

(51) Int. Cl.
*H05B 33/08* (2006.01)

(52) U.S. Cl.
CPC ......... *H05B 33/0815* (2013.01); *Y02B 20/348* (2013.01)

(58) Field of Classification Search
CPC . H05B 33/08; H05B 33/0809; H05B 33/0815; H05B 33/0818
USPC ............... 315/291, 294, 297, 307, 308, 312
See application file for complete search history.

(56) References Cited

U.S. PATENT DOCUMENTS

| | | | | |
|---|---|---|---|---|
| 4,502,104 A | * | 2/1985 | Mitchell | ............... H02M 3/158 323/266 |
| 6,314,007 B2 | * | 11/2001 | Johnson, Jr. | .................... 307/66 |
| 2010/0109559 A1 | * | 5/2010 | Chen | ................... H05B 33/0827 315/294 |
| 2010/0148681 A1 | * | 6/2010 | Kuo | .................... H05B 33/0818 315/193 |

OTHER PUBLICATIONS

Aug. 18, 2014 Office Action from U.S. Appl. No. 13/859,869.
Aug. 18, 2014 Office Action and Notice of References Cited from U.S. Appl. No. 13/859,869.

* cited by examiner

*Primary Examiner* — Douglas W Owens
*Assistant Examiner* — Jonathan Cooper
(74) *Attorney, Agent, or Firm* — Patent Law Professionals, P.C.; William E. Winters

(57) ABSTRACT

A solid-state lighting system comprises a plurality of light-emitting devices (e.g., light-emitting diodes) and an alternating current to direct current (AC-DC) converter that converts AC power to DC power for powering the plurality of light-emitting devices. The AC-DC converter is configured to perform AC-DC conversion directly, without the need for or use of a bridge rectifier or step-down transformer. According to one aspect of the invention, the light-emitting devices of the solid-state lighting system are autonomous and individually powered by a plurality of DC power supplies generated from the DC power produced by the AC-DC converter. According to another aspect, a plurality of phase-offset dimmer control signals are generated based on waveform distortions in a dimming signal produced by a conventional dimmer switch. The phase-offset dimmer control signals are used to individually control the dimming of the light-emitting devices.

6 Claims, 14 Drawing Sheets

100

| Switch | Vin > Vdc | Vin < -Vdc | \|Vin\| < Vdc |
|---|---|---|---|
| 802 | D | OFF | OFF |
| 804 | 1-D | ON | OFF |
| 806 | OFF | D | OFF |
| 808 | ON | 1-D | OFF |

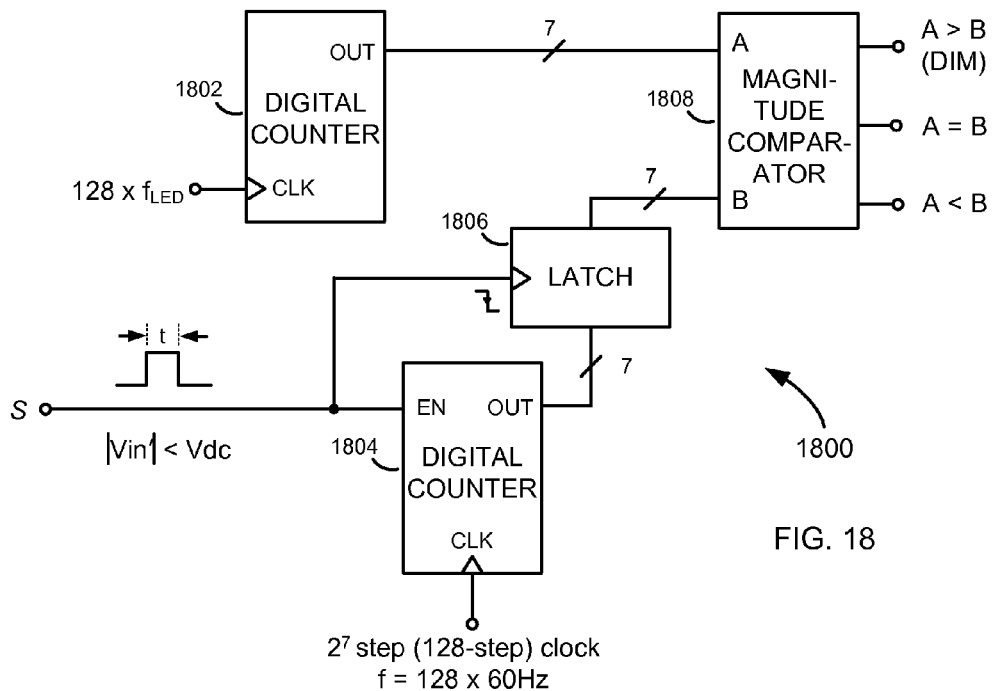
FIG. 18
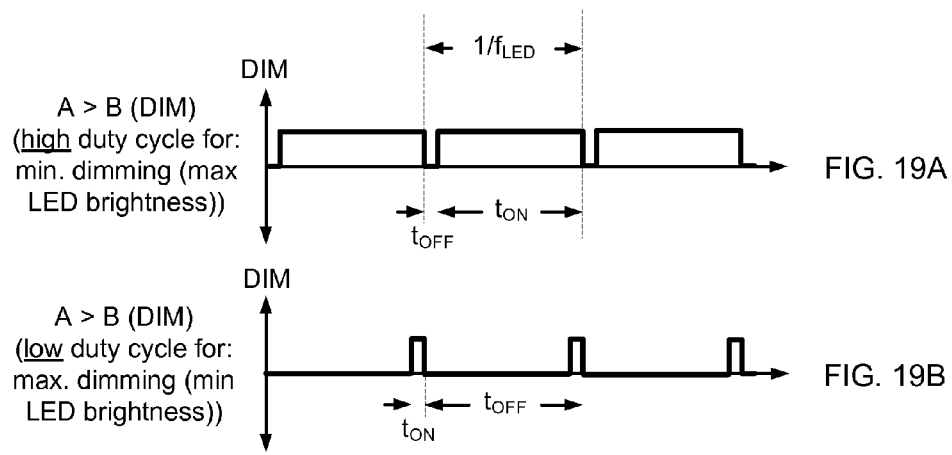
FIG. 19A
FIG. 19B

POWER CONVERSION AND CONTROL SYSTEMS AND METHODS FOR SOLID-STATE LIGHTING

CROSS-REFERENCE TO RELATED APPLICATIONS

This application is a continuation of U.S. patent application Ser. No. 12/897,066 filed on Oct. 4, 2010, the disclosure of which is incorporated herein by reference, in its entirety and for all purposes.

FIELD OF THE INVENTION

The present invention relates in general to electrical power conversion and control methods and systems, and in particular to electrical power conversion and control methods and systems for solid-state lighting, such as, for example, light-emitting diode (LED) lighting.

BACKGROUND OF THE INVENTION

Due to their high efficiency and durability, light-emitting diodes (LEDs) are desirable candidates for providing general lighting in homes, offices and other environments. Whereas conventional incandescent lamps are only about 3% efficient, LEDs have efficiencies of 30% or higher. LED lifetimes are also over 20 times longer than incandescent lamps and over 5 times longer than compact fluorescent lamps.

Although the lighting performance characteristics of LEDs are superior to more conventional lighting technologies, widespread adoption of LED lighting has been slow. The primary reason for the delay is that LED bulbs are expensive. In fact, at the present time LED bulbs cost about 10-25 times more than incandescent bulbs of comparable light output.

The high price of LED bulbs is significantly impacted by the costs involved in their manufacture, in particular the costs involved in manufacturing the power conversion circuitry needed to power the LED bulbs. Incandescent bulbs receive power directly from the AC mains. However, LED bulbs are DC powered. Consequently, if power from the AC mains is to be used, an LED bulb must be equipped with power conversion circuitry to convert the AC mains power to DC power.

FIG. 1 is a drawing of a prior art LED bulb 100, illustrating how AC power from the AC mains is converted to DC in existing LED bulbs. First, a bridge rectifier (i.e., diode bridge) 102 rectifies the AC input voltage Vin from the AC mains to DC. The rectified voltage is then filtered by a smoothing circuit, which in its simplest form comprises a smoothing capacitor 104 coupled to the output of the bridge rectifier 102. Finally, a DC-DC converter 106 steps down the rectified and filtered voltage to the appropriate DC output voltage Vout needed to power the LEDs in an LED string 108. The DC output voltage Vout is set based on the number of LEDs that are in the LED string 108, the number which is determined during design depending on required light output level (i.e., lumens) of the LED light bulb 100. Physically, the LEDs of the LED string 108 are arranged in a cluster and encased by diffuser lenses, which spread the light produced by the LEDs.

One well-known problem with the power conversion circuitry of the LED bulb 100 is that the bridge rectifier 102 and smoothing capacitor 104 present a nonlinear load to the AC mains. This nonlinearity causes the input current Iin from the AC mains to be drawn in the form of a series of narrow current pulses, as illustrated in FIG. 2. The narrow current pulses are rich in harmonics of the line frequency and characteristic of a power converter having a low power factor. Power factor is a dimensionless number between 0 and 1, describing how effectively a power converter is at transferring real power from an AC power source to a load. A low power factor is highly undesirable since it results in reduced conversion efficiency, heating in the AC mains generator and distribution systems, and noise that can interfere with the performance of other equipment.

To avoid problems associated with a low power factor, practical AC-DC power converters typically employ a power factor correction (PFC) pre-regulator 302 between the output of the bridge rectifier 102 and the input of the DC-DC converter 106, as illustrated in FIG. 3. The PFC pre-regulator 302 functions to force the input current Iin to be more sinusoidal and in phase with the AC input voltage Vin, thereby increasing the power factor. Unfortunately, introduction of the PFC pre-regulator 302 lowers energy efficiency, increases parts count and manufacturing costs, and makes it difficult to package the LED bulb 300 in a small form factor. Moreover, the PFC pre-regulator 302 usually contains a boost converter that generates high voltages. These high voltages tend to stress the LED bulb's 300 parts, leading to reliability problems. The high voltages also pose safety concerns.

Yet another problem with existing LED bulbs relates to their inherent inability to be controlled by conventional dimmer switches. Many homes and offices have dimmer switches that were designed to control the dimming of incandescent bulbs. It would be desirable to be able to use those pre-installed dimmer switches to control the dimming of LED bulbs.

FIG. 4 is a circuit diagram showing a conventional dimmer switch 400. The dimmer switch 400 comprises a variable resistor 402, a capacitor 404, a DIAC (diode for alternating current) 406, and a TRIAC (triode for alternating current) 408. The TRIAC 408 is triggered when the voltage across the capacitor 404 exceeds the breakdown voltage of the DIAC 406. The voltage increases and decreases according to the cycling of the AC input voltage Vin, and triggering of the TRIAC 408 is delayed for each positive and negative half cycle depending on the RC delay presented by the variable resistor 402 and capacitor 404. Accordingly, the turn-on delay 512 results in a distorted dimming waveform with a lower average power, as illustrated in FIG. 5B. In angular terms, the turn on delay 512 is referred to in the art as the "firing angle" (180°−θ), where θ is known as the "conduction angle." The ability to control the firing angle by adjusting the variable resistor 402 therefore provides the ability to control the average power delivered to the incandescent bulb 410 and, consequently, the dimming of the incandescent bulb 410.

The TRIAC dimmer switch 400 is suitable for controlling the dimming of incandescent bulbs. Unfortunately, it does not provide an acceptable solution for dimming existing LED bulbs, like the prior art LED bulbs 100 and 300 in FIGS. 1 and 3. Incandescent bulbs present a resistive load during all portions of the AC input waveform cycle. However, LEDs are nonlinear devices and draw significantly less current than do incandescent bulbs. At increased dimming (i.e., low light output levels) in particular, the current drawn by the LEDs of existing LED bulbs can be so small that the current drops below the holding current of the TRIAC 408. Under these conditions, the TRIAC 408 can retrigger or turn OFF, resulting in annoying LED flickering, or the LED bulb prematurely turning OFF before reaching the desired dimming level. The presence of the AC-DC power conversion circuitry between the AC power source and LEDs can also interfere with the ability of the TRIAC dimmer switch 400 to control the dimming of the LEDs.

Considering the foregoing drawbacks and limitations of existing LED bulbs, it would be desirable to have power conversion and control methods and apparatus for LED bulbs that are energy-efficient, inexpensive to manufacture, compact, safe to use, reliable, and provide the ability to control the dimming of LEDs of the LED bulb over a wide dimming range using conventional dimmer switches.

SUMMARY OF THE INVENTION

Solid-state lighting systems and power conversion and control methods therefor are disclosed. An exemplary solid-state lighting system comprises a plurality of light-emitting devices (e.g., light-emitting diodes) and an alternating current to direct current (AC-DC) converter that converts AC power to DC power for powering the plurality of light-emitting devices. The AC-DC converter is configured to perform AC-DC conversion directly, without the need for or use of a bridge rectifier or step-down transformer. According to one aspect of the invention, the light-emitting devices of the solid-state lighting system are autonomous and individually powered by a plurality of DC power supplies generated from the DC power produced by the AC-DC converter. According to another aspect, a plurality of phase-offset dimmer control signals are generated based on waveform distortions in a dimming signal produced by a conventional dimmer switch. The phase-offset dimmer control signals are used to control the dimming of the plurality of light-emitting devices.

The solid-state lighting systems and methods of the present invention offer a number of advantages over prior art solid-state lighting systems and methods. First, the solid-state lighting systems of the present invention have a lower parts count and are less costly to manufacture than prior art solid-state lighting systems. Using the disclosed AC-DC converter obviates the need for bridge rectifiers, step-down transformers, and power factor correction pre-regulator circuitry, and most, if not all of the solid-state lighting system components are amenable to being formed in one or more integrated circuit (IC) chips. The reduced parts count and ability to form the solid-state lighting system components in one or more IC chips lowers manufacturing costs and affords the ability to realize economies of scale. Second, the AC-DC converter, reduced parts count, and ability to form some or all of the power conversion and control components in one or more IC chips, all contribute to the ability to manufacture a solid-state lighting system that is more energy efficient than prior art solid-state lighting systems. Third, the solid-state lighting systems of the present invention are more reliable and have a longer lifetime than prior art solid-state lighting systems. Powering the light-emitting devices of the solid-state lighting system of the present invention using separate power supplies results in increased reliability, and configuring the light-emitting devices so that they are autonomous and individually dimmable allows the solid-state lighting system of the present invention to last longer, since the entire system will not completely fail if just one or a couple of the light-emitting devices fail. Finally, the solid-state lighting systems of the present invention provide the highly desirable benefit of being dimmable in response to conventional dimmer switches, even to very low light levels and without flickering or premature light cut-off.

Further features and advantages of the invention, including descriptions of the structure and operation of the above-summarized and other exemplary embodiments of the invention, will now be described in detail with respect to accompanying drawings, in which like reference numbers are used to indicate substantially identical or functionally similar elements.

BRIEF DESCRIPTION OF THE DRAWINGS

FIG. 18 is a circuit diagram of a frequency translator that may be used to transform duty cycle information in the logic signal S from the comparison circuit in FIG. 17 to a higher frequency;

FIGS. 19A and 19B are signal diagrams illustrating how the DIM signal produced by the frequency translator in FIG. 18 has a high duty cycle for minimum dimming (FIG. 19A) and a low duty cycle for maximum dimming (FIG. 19B);

DETAILED DESCRIPTION

The exemplary embodiments of the present invention set forth below are described and illustrated in the context of solid-state lighting, particularly power conversion and control methods and systems for LED lighting. It is to be emphasized and understood, however, that the power conversion and control methods of the present invention are not limited to LED lighting applications; they are applicable to other lighting and non-lighting applications employing other types of loads, including solid-state (or non-solid-state) lighting devices other than LEDs, and devices that do not emit light but perform some other useful function.

Figure 6:
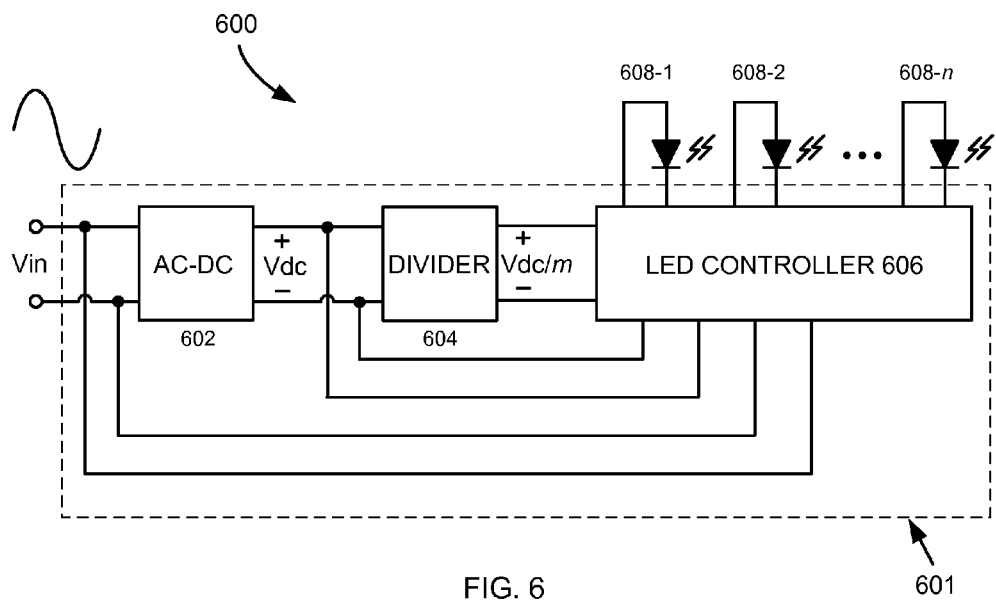
FIG. 6 is a drawing of an LED bulb, according to an embodiment of the present invention.

Referring to FIG. 6, there is shown a light-emitting diode (LED) bulb 600, according to an embodiment of the present invention. The LED bulb 600 comprises power conversion and control circuitry 601 that includes an alternating current to direct current (AC-DC) converter 602, a divider 604, and an LED controller 606; and LEDs 608-1, 608-2, . . . , 608-n, where n is an integer indicating that the LEDs may comprise one or a plurality of LEDs. As will be explained in detail below, the AC-DC converter 602 directly converts AC power, such as may be provided by the AC mains, to DC power. The divider 604 divides the DC voltage Vdc of the DC power generated by the AC-DC converter 602 by a factor m, thereby generating one or a plurality m of separate power supplies for powering the n LEDs 608-1, 608-2, . . . , 608-n. The factor m is an integer, and in one embodiment is an integer having the same value as n. The LED controller 606 comprises one or more controlled current sources for controlling the currents passing through the LEDs 608-1, 608-2, . . . , 608-n and, optionally, further includes circuitry that affords the ability to control the dimming of the LEDs 608-1, 608-2, . . . , 608-n using a conventional dimmer switch.

In one embodiment of the invention, some or all of the various components of the power conversion and control circuitry 601 comprise a single integrated circuit (IC) chip. In another embodiment, some or all of the various components of the power conversion and control circuitry 601 comprise and are distributed among two or more IC chips. However, any number and combination of IC chips, hybrid circuits, or discrete devices may be used to implement the power conversion and control circuitry 601 of the LED bulb 600, as will be readily appreciated and understood by those of ordinary skill in the art.

Figure 7:
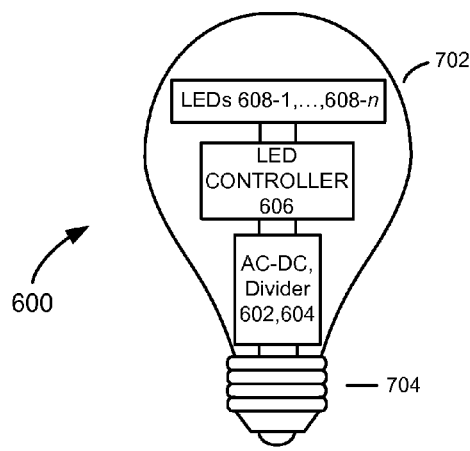
FIG. 7 is a drawing of the LED bulb in FIG. 6, illustrating how the LEDs of the LED bulb are enclosed in a transparent or translucent enclosure and how the electrical components of the LED bulb are coupled to a standard Edison screw base.

The LEDs 608-1, 608-2, . . . , 608-n of the LED bulb 600 are configured within a transparent or translucent enclosure, and the AC-DC converter 602, divider 604, and LED controller 606 are integrated in or attached to a base that is compatible with a standardized receptacle or socket. For example, in one embodiment, the transparent or translucent enclosure comprises a glass bulb 702, and the AC-DC converter 602, divider 604, and LED controller 606 are attached to or integrated within an Edison screw base 704, as illustrated in FIG. 7. Other types of transparent or translucent enclosures (standardized or non-standardized) and other base types (standardized or non-standardized) may be used, as will be appreciated by those of ordinary skill in the art. Accordingly, for the purpose of this disclosure the term "LED bulb" refers to and encompasses within its meaning an LED lighting apparatus having any type of enclosure and any type of base.

Figure 8:
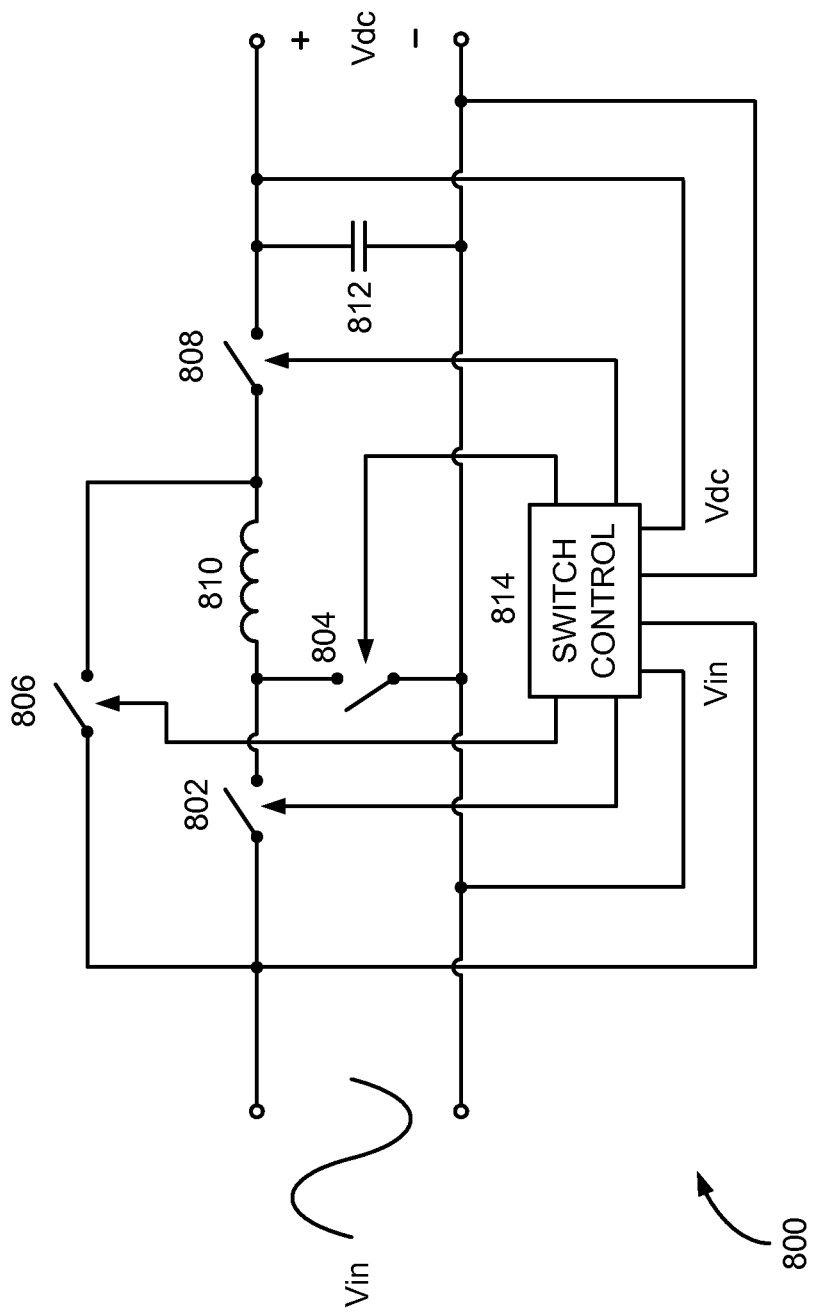
FIG. 8 is a circuit diagram of an alternating current to direct current (AC-DC) converter that used to implement the AC-DC converter of the LED bulb in FIG. 6.

FIG. 8 is a circuit diagram of an AC-DC converter 800 used to implement the AC-DC converter 602 of the LED bulb 600 in FIG. 6, according to one embodiment of the present invention. The AC-DC converter 800 is similar to the AC-DC converter disclosed in co-pending and commonly owned U.S. patent application Ser. No. 12/841,608, entitled AC/DC Power Conversion Methods and Apparatus, which is hereby incorporated into this disclosure by reference.

As shown in FIG. 8, the AC-DC converter 800 comprises first, second, third and fourth switches 802, 804, 806 and 808, an inductor 810, a smoothing capacitor 812, and a switch control 814. The first switch 802 is coupled between one terminal of the AC input and a first terminal of the inductor 810; the second switch 804 is coupled between the first terminal of the inductor 810 and the opposing-polarity terminal of the AC input; the third switch 806 is coupled between the AC input and the second terminal of the inductor 810; and the fourth switch 808 is coupled between the second terminal of the inductor 810 and the positive DC output terminal. The switch control 814 generates switch drive signals for controlling the switching of the first, second, third and fourth switches 802, 804, 806 and 808, depending on the instantaneous AC input voltage Vin compared to the DC output voltage, as is explained in more detail below.

In one embodiment of the invention, the first, second, third, and fourth switches 802, 804, 806 and 808 comprise silicon-based transistors (e.g., metal-oxide-semiconductor field-effect transistors (MOSFETs) or bipolar junction transistors (BJTs)) of an integrated circuit (IC) chip manufactured according to a standard semiconductor manufacturing process. The inductor 810 and capacitor 812 may also be integrated in the one or more IC chips, or either or both of these devices may be discrete devices coupled to external pins of the one or more IC chips. Of course, other types of switching devices and semiconductor manufacturing processes may be used. For example, conventional switches, diodes, relays, or other semiconductor-based or non-semiconductor-based switching device may be used, or compound-semiconductor-based transistor devices, such as high electron mobility transistors (HEMTs) or heterojunction bipolar transistors (HBTs), may be used to implement the first, second, third, and fourth switches 802, 804, 806 and 808 switches, instead of silicon-based MOSFETs or BJTs. For the purpose of this disclosure, the term "switch" is used in its broadest sense to include all of these types of switches and any other suitable switching device.

The AC-DC converter 800 operates by converting an AC input voltage Vin, such as may be provided by the AC mains, to a DC output voltage Vdc, without the need for a bridge rectifier (i.e., diode bridge). Direct AC-DC conversion is accomplished by controlling the ON-OFF states of the first, second, third, and fourth switches 802, 804, 806 and 808 using the switch control 814. The switches 802, 804, 806 and 808 are turned ON (closed), turned OFF (opened), driven by a switch drive signal of duty cycle D, or driven by a complementary switch drive signal of duty cycle (1−D), depending on the instantaneous AC input voltage Vin compared to the DC output voltage Vdc. The switch drive signal and the complementary switch drive signal are generated by the switch control 814 and in one embodiment have a common, fixed switching (i.e., "chopping") frequency f=1/T, where T is the switching period. To avoid the need for physically large and expensive capacitors, the chopping frequency f of the switch control is set at a high frequency of about 1 MHz or higher.

Figures 9, 10:
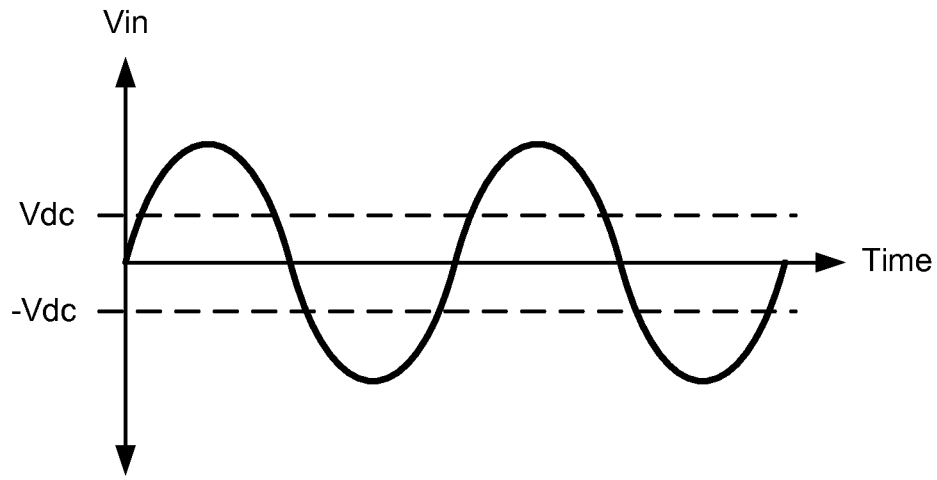
FIG. 9 is a signal diagram of the AC input voltage Vin supplied to the AC-DC converter in FIG. 8, and its relationship to the DC voltage Vdc produced at the output of the AC-DC converter and its inverse −Vdc.
FIG. 10 is a table showing how the switches of the AC-DC converter in FIG. 8 are switched and driven, depending on the instantaneous value of the AC input voltage Vin compared to the DC voltage Vdc produced at the output of the AC-DC converter in FIG. 8 and its inverse −Vdc.

As illustrated in the signal diagram in FIG. 9 and shown in the switching table in FIG. 10, when Vin>Vdc, the first switch 802 is driven by the switch drive signal at a duty cycle $t_{ON}/T=D$, the second switch 804 is driven by the complementary switch drive signal at a duty cycle $(T-t_{ON})/T=(1-D)$, the third switch 806 is turned OFF, and the fourth switch 808 is turned ON. When Vin<−Vdc, the first switch 802 is turned OFF, the second switch 804 is turned ON, the third switch 806 is driven by the switch drive signal at a duty cycle D, and the fourth switch is driven by the complementary switch drive signal at a duty cycle (1−D). Finally, when Vin is greater than −Vdc but less than Vdc, i.e. when |Vin|<Vdc, the first, second, third, and fourth switches 802, 804, 806 and 808 are all turned OFF.

Figure 11A:
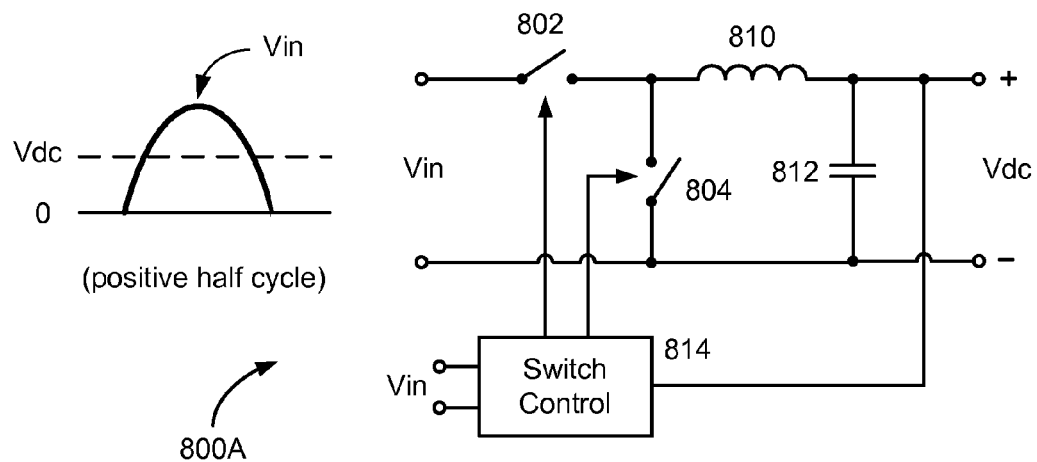
FIG. 11A is a circuit diagram illustrating how the AC-DC converter in FIG. 8 reduces to and operates as a buck converter during times of positive half cycles of the AC input waveform when Vin>Vdc.

The AC-DC converter 800 produces a DC output voltage Vdc=D|Vin|, as can be understood by observing that the AC-DC converter 800 actually comprises an integrated (i.e., conjoined) buck converter and inverting buck converter. During positive half cycles of the AC input waveform when Vin>Vdc, the third switch 806 is OFF, the fourth switch 808 is ON, and the AC-DC converter 800 reduces to and operates as a buck converter 800A, as illustrated in FIG. 11A. In this configuration the first and second switches 802 and 804 serve as the high-side and low-side switches of the buck converter and are driven by the switch drive signal at duty cycle D and complementary switch drive signal at a duty cycle (1−D), respectively. The first and second switches 802 and 804 therefore alternately configure the inductor 810 between storing energy and supplying current during positive half cycles of the AC input voltage when Vin>Vdc, and the DC output voltage Vdc=DVin.

Figure 11B:
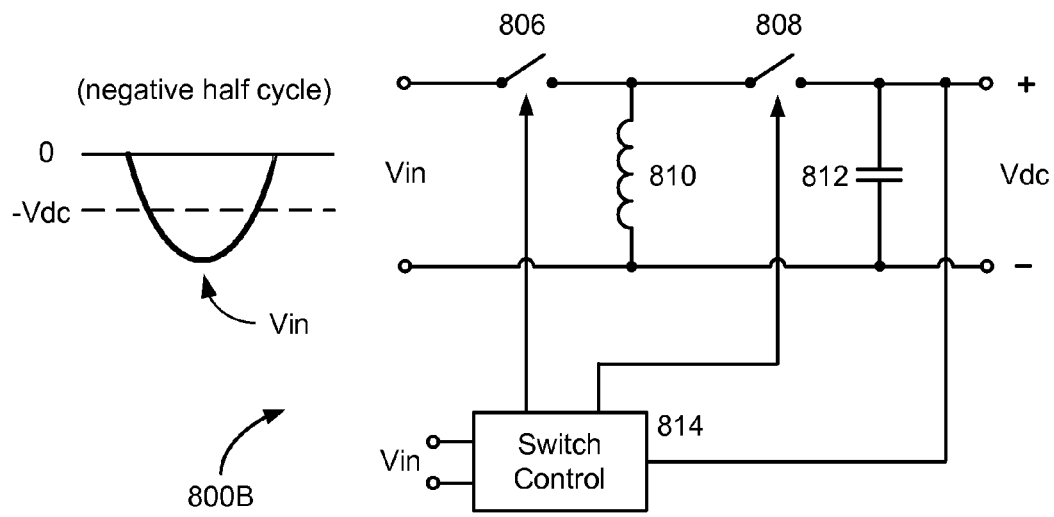
FIG. 11B is a circuit diagram illustrating how the AC-DC converter in FIG. 8 reduces to and operates as an inverting buck converter during times of negative half cycles of the AC input waveform when Vin<−Vdc.

During negative half cycles of the AC input waveform when Vin<−Vdc, the first switch 802 is OFF, the second switch 804 is ON, and the AC-DC converter 800 reduces to and operates as what may be referred to as an "inverting" buck converter 800B, as illustrated in FIG. 11B. In this configuration the third and fourth switches 806 and 808 are driven by the switch drive signal D and complementary switch drive signal (1−D), respectively. The inverting buck converter 800B inverts the negative input voltage Vin, alternately configuring the inductor 810, by the switching action of the third and fourth switches 806 and 808, between storing energy and supplying current during the negative half cycles of the AC input voltage when Vin<−Vdc, to produce an output voltage Vdc equal to D|Vin|. Hence, considering both positive and negative half cycles, the AC-DC converter 800 produces a DC output voltage Vdc=D|Vin|.

In the exemplary embodiment described above, the switch control circuit 814 controls the opening and closing of the switches 802, 804, 806 and 808 according to the switching table in FIG. 10 for all load conditions. In another embodiment, the switch control 814 is configured to hold switch 808 open during light load conditions, and the remaining switches 802, 804 and 806 are configured to operate according to the switching table in FIG. 10 (or are configured to not switch at all). Accordingly, in this alternative embodiment, the capacitor 812 serves as the DC power supply source during light load conditions.

One important advantage of using the AC-DC converter 800 is that it performs AC-DC conversion directly, without the need for or use of a bridge rectifier or step-down transformer. This obviates the need for power factor correction pre-regulator circuitry to compensate for the nonlinearity presented by the bridge rectifier. This advantage results in an LED bulb 600 that has a lower parts count, that is less expensive to manufacture, and which is capable of being designed to have a much smaller physical size (i.e., smaller form factor) than prior art LED bulbs. It also results in an LED bulb 600 that is more energy efficient, more reliable, and safer to use.

According to an embodiment of the invention, each of the LEDs of the LED bulbs of the present invention is autonomous and individually powered by a separate power supply. In the exemplary embodiment shown in FIG. 6, this aspect of the invention is realized by configuring the divider 604 to generate and provide a plurality m of separate power supplies of voltage Vdc/m for powering the n LEDs 608-1, 608-2, . . . , 608-n of the LED bulb 600. Having autonomous and independently-powered LEDs 608-1, 608-2, . . . , 608-n allows for graceful degradation of the LED bulb 600, since if one of the LEDs fails 608-1, 608-2, . . . , 608-n the others can remain lit.

Figure 12:
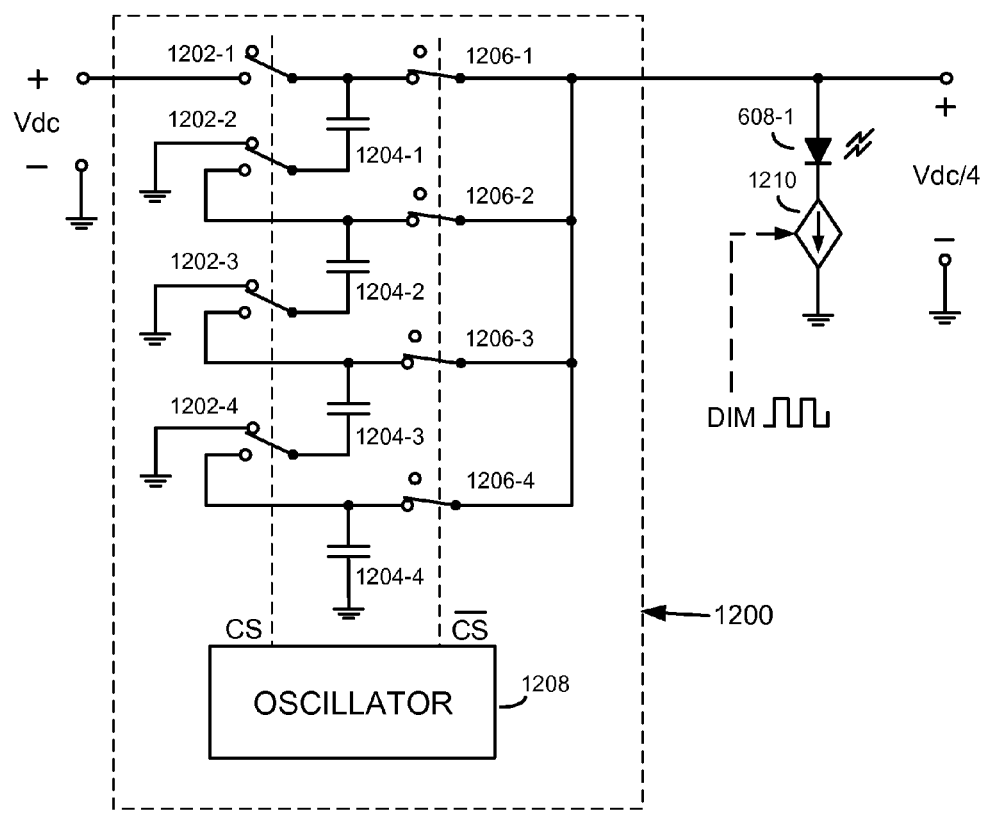
FIG. 12 is a circuit diagram of a charge pump divider that may be used to implement the divider in the LED bulb in FIG. 6.

FIG. 12 is a circuit diagram of a charge pump divider 1200 that can be used to generate the m power supplies provided by the divider 604. For the purpose of this illustration, it is assumed that the LED bulb 600 contains four LEDs (i.e., n=4), and that four charge pump dividers 1200 are correspondingly employed to generate m=n=4 separate power supplies, each power supply having a voltage Vdc/4. Those of ordinary skill in the art will understand, of course, that this is only an example and that the LED bulb 600 is not limited to having four LEDs, and that the charge pump divider 1200 can be modified to generate other numbers m of power supplies.

Figure 13A:
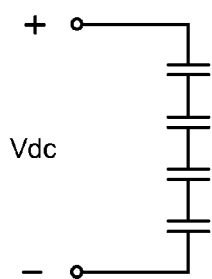
FIG. 13A is a simplified equivalent circuit diagram of the charge pump divider in FIG. 12 when the charge pump divider is configured in a "charge" state.
Figure 13B:
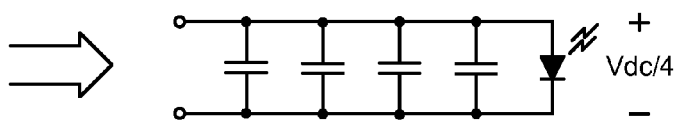
FIG. 13B is a simplified equivalent circuit diagram of the charge pump divider in FIG. 12 when the charge pump divider is configured in a "load" state.

As shown in FIG. 12, the charge pump divider 1200 comprises a first set of switches 1202-1, 1202-2, 1202-3, 1202-4; capacitors 1204-1, 1204-2, 1204-3, 1204-4; second set of switches 1206-1, 1206-2, 1206-3, 1206-4; and an oscillator 1208. The charge pump divider 1200 is configured to supply power to LED 608-1, which is driven by a controlled current source 1210 that is enabled and disabled according to a dimmer signal DIM, as will be discussed in more detail below. Substantially identical charge pump dividers are employed to generate and supply power to the remaining LEDs 608-2, . . . , 608-n. The first set of switches 1202-1, 1202-2, 1202-3, 1202-4 and second set of switches are 1206-1, 1206-2, 1206-3, 1206-4 alternately configure the capacitors 1204-1, 1204-2, 1204-3, 1204-4 in a "charge" state and a "load" state, in response to periodic switch (i.e., charge state) control signals CS and $\overline{CS}$ provided by the oscillator 1208. When in the charge state, the switches of the first set of switches 1202-1, 1202-2, 1202-3, 1202-4 are all closed and the switches of the second set of switches are all open, resulting in the capacitors 1204-1, 1204-2, 1204-3, 1204-4 being coupled in series, as illustrated in the charge-state equivalent circuit in FIG. 13A. The capacitors 1204-1, 1204-2, 1204-3, 1204-4 all have the same capacitance. Consequently, the DC voltage Vdc is divided and distributed evenly (Vdc/4) among the series-connected capacitors 1204-1, 1204-2, 1204-3, 1204-4. After the capacitors 1204-1, 1204-2, 1204-3, 1204-4 have charged, the switch control signals CS and $\overline{CS}$ cause the first set of switches 1202-1, 1202-2, 1202-3, 1202-4 to open and the second set of switches 1206-1, 1206-2, 1206-3, 1206-4 to close, configuring the charge pump divider 1200 in the load state, as illustrated in the load-state equivalent circuit in FIG. 13B. In the load state, the charged, parallel-connected capacitors 1204-1, 1204-2, 1204-3, 1204-4 collectively supply power to the LED 608-1.

Figure 14:
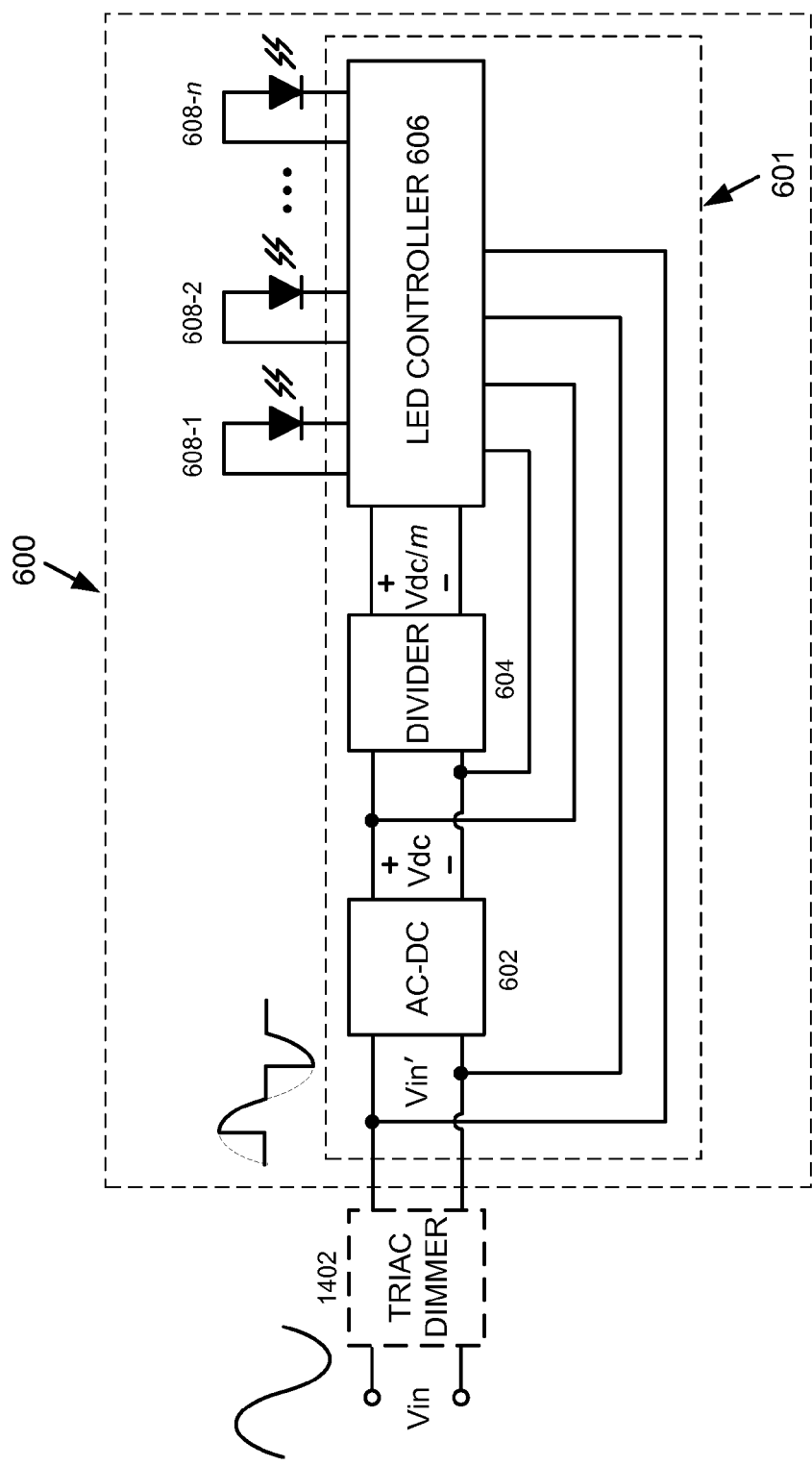
FIG. 14 is a drawing illustrating how the dimming of the LEDs of the LED bulb in FIG. 6 may be controlled by a conventional TRIAC dimmer switch.

According to one embodiment of the invention illustrated in FIG. 14, the LED bulb 600 of the present invention is dimmable using a conventional TRIAC (triode for alternating current) dimmer switch 1402. The TRIAC dimmer switch 1402 is shown by a dashed box to emphasize that in this exemplary embodiment it is separate from the LED bulb 600. However, in another embodiment it (or other similar dimmer switch) comprises part of the LED bulb 600.

Figure 1:
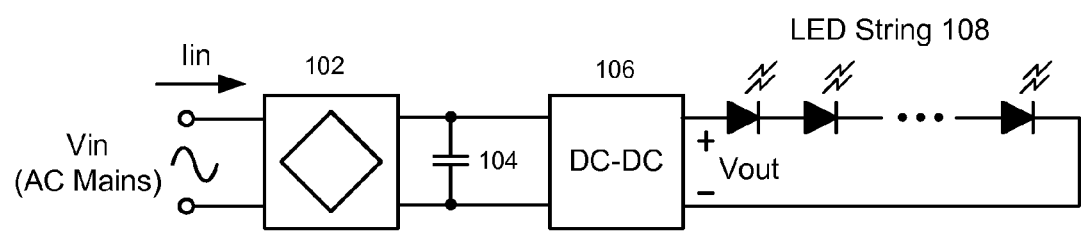
FIG. 1 is a drawing of a prior art LED bulb.
Figure 2:
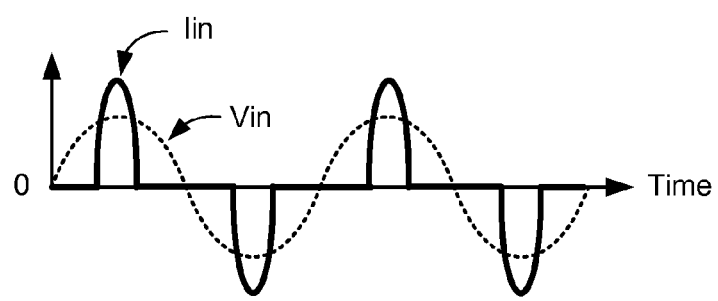
FIG. 2 is a signal diagram of the input line voltage Vin applied to and input line current Iin drawn from the AC mains for the prior art LED in FIG. 1.
Figure 3:
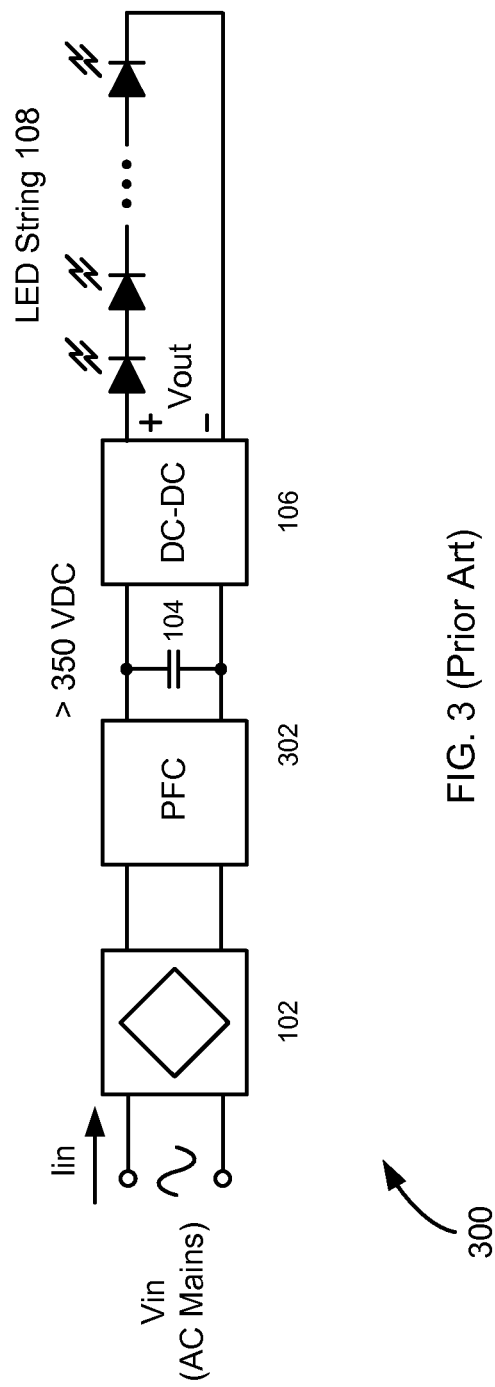
FIG. 3 is drawing of a prior art LED bulb equipped with a power factor correction (PFC) pre-regulator.
Figure 5A:
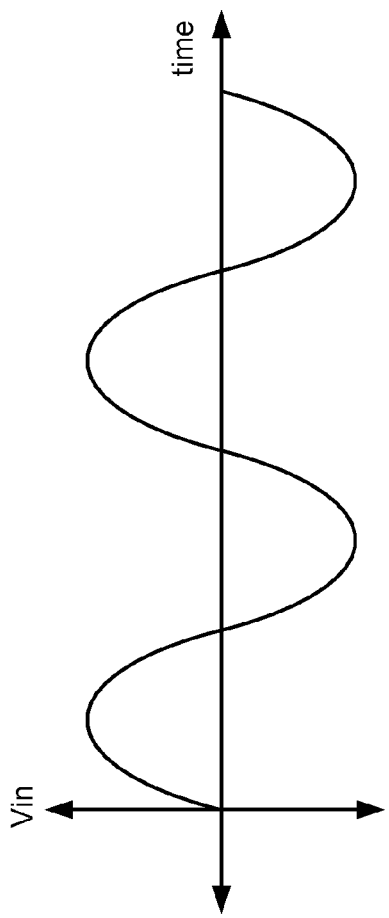
FIGS. 5A and 5B are line voltage Vin and dimming waveforms associated with the TRIAC dimmer switch in FIG. 4.
Figure 5B:
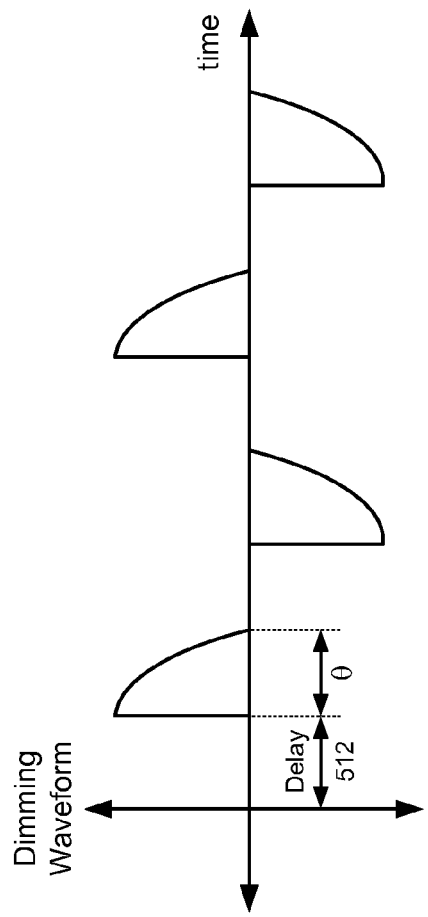
Figure 4:
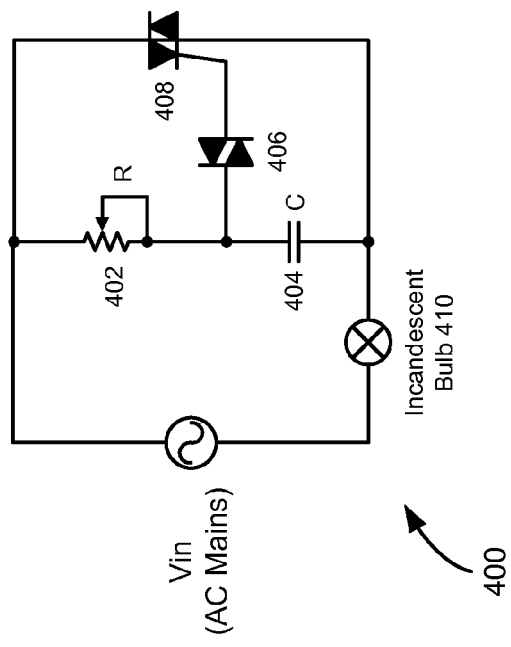
FIG. 4 is circuit diagram of a conventional phase control (i.e., TRIAC (triode for alternating current)) dimmer switch.
Figure 15A:
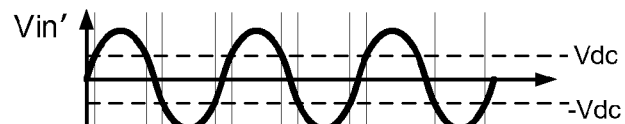
FIGS. 15A-D are signal diagrams associated with the operation of the LED bulb in FIG. 6 when the TRIAC dimmer switch in FIG. 14 is not active.
Figure 15B:
Figure 15C:
Figure 15D:
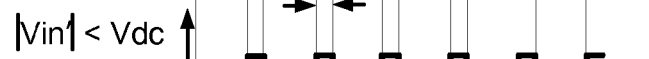
Figure 16A:
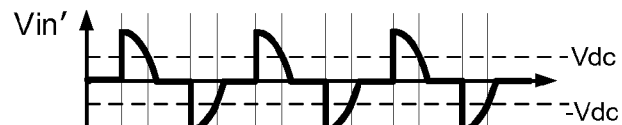
FIGS. 16A-D are signal diagrams associated with the operation of the LED bulb in FIG. 6 when the TRIAC dimmer switch in FIG. 14 is active.
Figure 16B:
Figure 16C:
Figure 16D:

As was explained above in reference to FIGS. 4 and 5 above, a TRIAC dimmer distorts the AC input waveform so that the average power delivered to the bulb is reduced. By itself the TRIAC dimmer switch does not provide an acceptable solution for controlling the dimming of the LED bulbs of the present invention. However, the distorted voltage waveform (i.e., modified input voltage Vin') that it produces does contain information that can be used to control the dimming. As illustrated in FIG. 15A, with no dimming active, the modified input voltage Vin' provided by the TRIAC dimmer switch 1402 is substantially the same as the AC input voltage Vin supplied by the AC mains. Under this condition, FIGS. 15B and 15C show that Vin' is greater than Vdc or less than −Vdc for appreciable portions of the AC cycle period, and FIG. 15D shows that |Vin'| is less than Vdc for only very short periods of time t1. However, when dimming is active and waveform distortion is applied by the TRIAC dimmer switch 1402 (see FIG. 16A), the modified input voltage Vin' remains greater than Vdc or less than −Vdc for shorter portions of the AC cycle period (see FIGS. 16B and 16C) and |Vin'| remains less than Vdc for longer durations of time t2, i.e., t2>t1 (see FIG. 16D).

Figure 17:
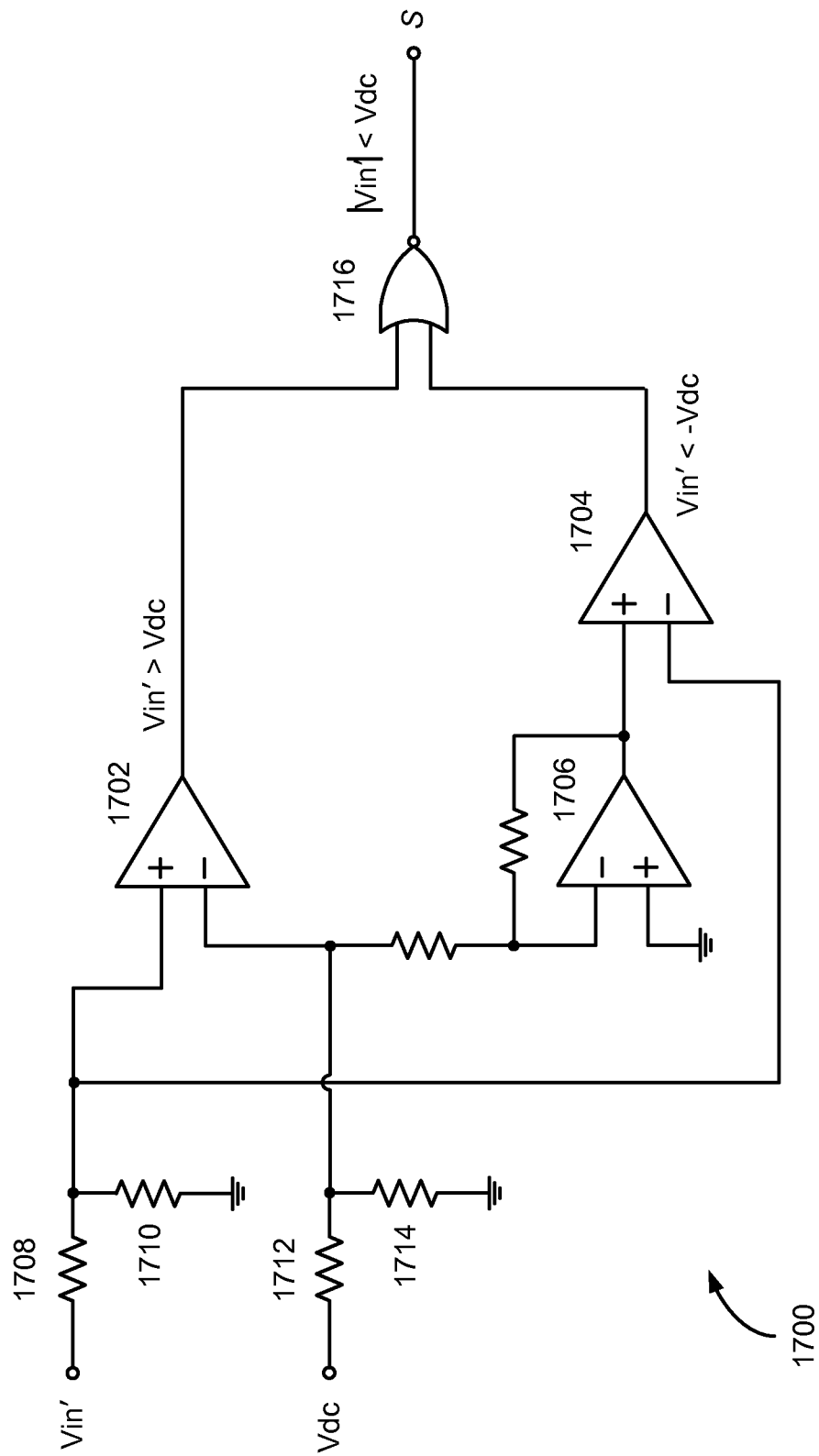
FIG. 17 is a comparison circuit that compares the dimmer waveform of the TRIAC dimmer switch in FIG. 14 to the DC voltage at the output of the AC-DC converter.

To exploit this pulse-width versus dimming-level dependency in controlling the dimming of the LEDs 608-1, 608-2, . . . , 608-n of the LED bulb 600, the LED controller 606 of the LED bulb 600 includes a comparison circuit 1700, shown in FIG. 17, which operates to generate a logic signal S indicative of times when |Vin'|<Vdc. The comparison circuit 1700 comprises first and second comparators 1702 and 1704, an inverting amplifier 1706, a first voltage divider including resistors 1708 and 1710 (or, alternatively, capacitors), a second voltage divider including resistors 1712 and 1714 (or, alternatively, capacitors), and a logic NOR gate 1716. The first and second voltage dividers may not be necessary depending on the acceptable input voltage ranges of the various amplifiers. If, however, the modified AC input voltage Vin' is not within the acceptable input ranges, it is scaled down using the first and second voltage dividers. Specifically, the first voltage divider scales the modified input voltage Vin' down to a scaled, modified AC input voltage αVin' so that the voltage is within the acceptable input voltage range limit of the first and second comparators 1702 and 1704, and the second voltage divider scales the DC output voltage Vdc of the AC-DC converter 602 by the same amount to produce a scaled DC output voltage αVdc. The first comparator 1702 compares the scaled, modified AC input voltage αVin' to the scaled DC output voltage αVdc, producing a high output voltage when Vin'>Vdc and a low output voltage when Vin'<Vdc. The inverting amplifier 1706 inverts the scaled DC output voltage αVdc to produce a scaled, inverted DC output voltage −αVdc. The second comparator 1704 compares the scaled, inverted DC output voltage −αVdc to the scaled, modified AC input voltage αVin', producing a high output voltage when Vin'<−Vdc and a low output voltage when Vin'>−Vdc. Finally, the NOR gate generates the desired logic signal S, which has a logic high ("1") whenever |Vin'|<Vdc and a logic low ("0") for all other times.

The logic signal S has a variable duty cycle that depends on the dim setting of the TRIAC dimmer switch 1402. In accordance with an embodiment of the present invention, this dependency is used to control the dimming of the LEDs 608-1, 608-2, . . . , 608-n of the LED bulb 600, specifically by duty cycling the ON-OFF ratio of the LEDs 608-1, 608-2, . . . , 608-n. Because the logic signal S has a low frequency equal to only that of the line frequency (60 Hz in the United States), however, it is first translated up in frequency in order to avoid any perceptibility of LED flickering, as will be explained in detail below. While the logic signal S in this exemplary embodiment is generated based on times when the comparison circuit 1700 determines that |Vin'|<Vdc, it should be pointed out that the logic signal S may be alternatively generated based on other signal characteristics in the distorted waveform Vin', such as, for example, the firing angle or conduction angle of the distorted waveform Vin'.

FIG. 18 is a circuit diagram of an exemplary frequency translator 1800 used to transform the duty cycle information in the logic signal S to a higher frequency. In one embodiment, it is included within the LED controller 606 of the LED bulb 600 and comprises first and second digital counters 1802 and 1804, a latch 1806, and a digital magnitude comparator 1808. The logic signal S from the comparison circuit 1700 is coupled to the enable (EN) input of the first digital counter 1802, which begins counting from zero at a rate of $2^7 \times 60$ Hz when the logic signal is a logic high, i.e., when |Vin'|<Vdc. The first digital counter 1802 counts until the logic signal S drops to a logic low, at which time the digital count is latched into the latch 1806 and coupled to input B of the digital magnitude comparator 1808. The second digital counter 1804 is a free-running counter that is configured to continuously and repeatedly count from 0 to 127, but at a rate much higher than the 60 Hz line rate, allowing the duty cycle information in the logic signal S to be translated to a higher frequency $f_{LED}$. $f_{LED}$ is set during design and in one embodiment is equal to 10 MHz. As the second digital counter 1804 counts, the digital comparator 1808 compares its count to the count held by the latch 1806. Eventually, the count exceeds the count held by the latch 1806, causing the A>B output of the digital comparator 1808 to change to a logic high. The A>B output remains at a logic high until the second digital counter 1804 counts to its limit ($2^7 - 1 = 127$). It then drops low and the second digital counter 1804 resets to zero to begin counting anew.

The A>B output signal of the digital comparator 1808 has a fixed high frequency $f_{LED}$ and a variable duty cycle dependent upon the dim level setting of the TRIAC dimmer switch 1402. For a minimum dim setting the duty cycle ($t_{ON}/t_{OFF}$) of the A>B signal is high, as illustrated in FIG. 19A, and for a maximum dim setting the duty cycle is low, as illustrated in FIG. 19B. The A>B signal can therefore be used to control the dimming of the LED bulb 600 over a wide dimming range by simply duty cycling the ON-OFF ratios of the LEDs 608-1, 608-2, ..., 608-n. According to one embodiment, the A>B signal is used as the "DIM" signal for enabling and disabling one or more controlled current sources that drive the LEDs 608-1, 608-2, ..., 608-n, similar to as shown in FIG. 12, where the controlled current source 1210 of the LED 608-1 is enabled and disabled in response to the DIM signal and in accordance with the DIM signal's duty cycle.

Figure 20:
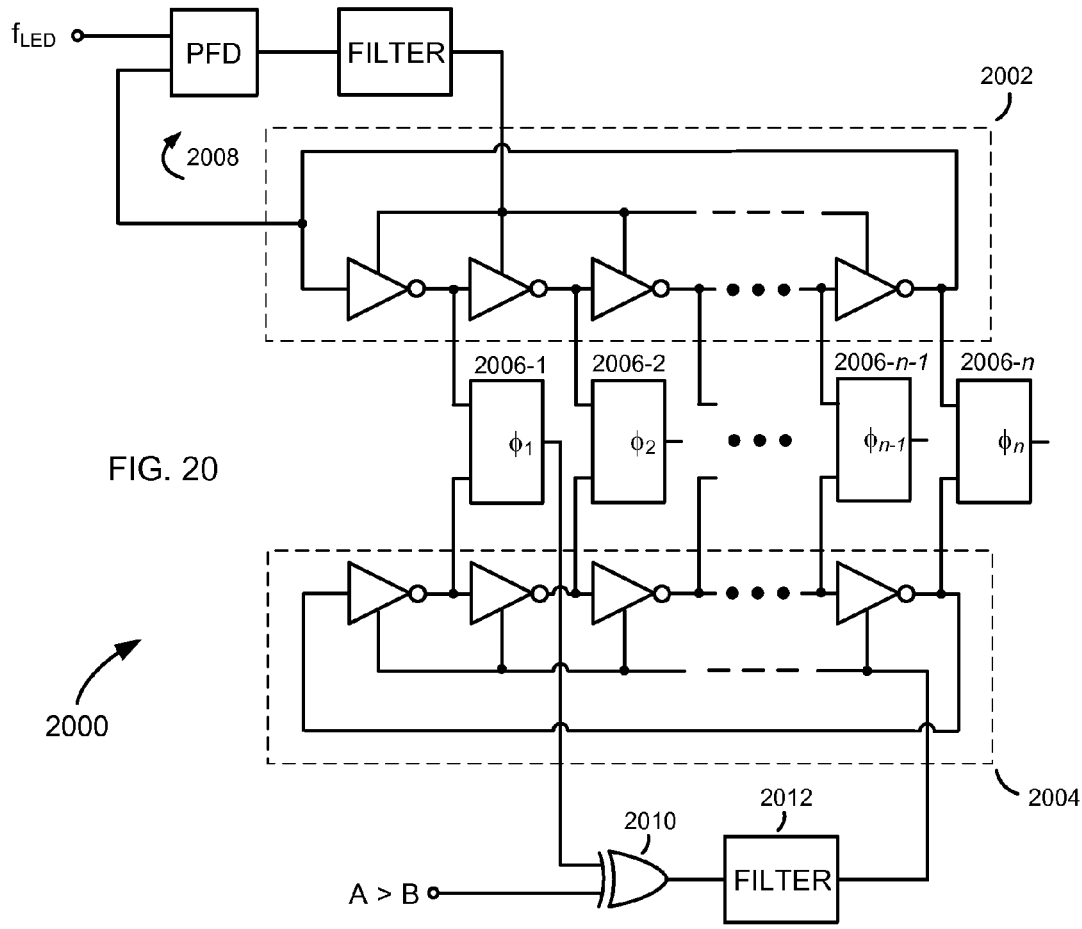
FIG. 20 is a circuit diagram of a phase generator that may be used to generate a plurality of dim control signals of different phases for controlling the dimming of the plurality of LEDs of the LED bulb in FIG. 6.
Figure 21:
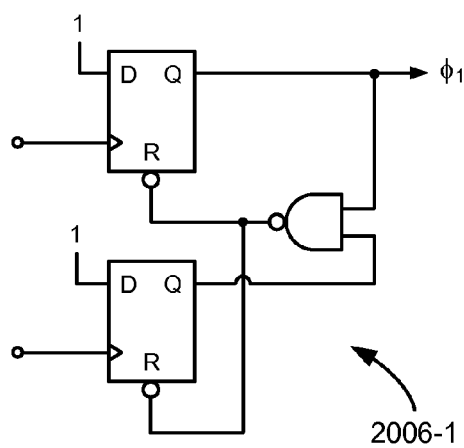
FIG. 21 is a circuit diagram of one of the synchronous phase-frequency detectors (S-PFDs) used in the phase generator in FIG. 20.

Depending on the number of LEDs being used in the LED bulb 600, simultaneous switching of the LEDs 608-1, 608-2, ..., 608-n ON and OFF by the same DIM signal may result in excessive loading. To avoid this problem, in one embodiment of the invention n dim control signals $\phi_1$, $\phi_2$, ..., $\phi_n$, each of a different phase with respect to the other, are generated and used to individually control the duty cycling of the ON-OFF ratio of the n LEDs 608-1, 608-2, ..., 608-n. FIG. 20 is a circuit diagram of an exemplary phase generator 2000 that may be used to generate the n dim control signal $\phi_1$, $\phi_2$, ..., $\phi_n$. In one embodiment of the invention, the phase generator 2000 comprises part of the LED controller 606 of the LED bulb 600 and includes master and slave ring oscillators 2002 and 2004 (or other type of multi-phase oscillators) and n synchronous phase-frequency detectors (S-PFDs) 2006-1, 2006-2, ..., 2006-n. A more detailed circuit diagram of the first S-PFD 2006-1 is shown in FIG. 21, the remaining S-PFDs 2006-2, ..., 2006-n being substantially the same.

The master ring oscillator 2002 is configured in a phase-locked loop 2008, which operates to lock the output frequency of the master ring oscillator 2002 to $f_{LED}$ and provide master phase references for comparison to the phases of the slave ring oscillator 2004. The A>B signal from the digital magnitude comparator 1808 of the frequency translator 1800 (FIG. 18) is used as a phase rotation command for shifting the phases of the slave ring oscillator 2004 relative to the phases of the master ring oscillator 2002. The S-PFDs 2006-1, 2006-2, ..., 2006-n generate the n dim control signals $\phi_1$, $\phi_2$, ..., $\phi_n$ each of which has pulse of widths proportional to the phase difference of the phases of the master and slave ring oscillators 2002. An XOR gate 2010 compares the pulse widths of one of the S-PFDs (in this example S-PFD 2006-1) to the pulse widths in the A>B signal. When the compared pulse widths fail to match, the XOR gate 2010 generates a perturbation pulse. Over time these perturbation pulses are averaged by the filter 2012, to produce a perturbation signal that is used to alter the power supply of the slave oscillator 2004. Modifying the slave oscillator power supply affects the delays of the inverters in the slave ring oscillator 2004 and, consequently, the phase relationship of the phases of the slave ring oscillator 2004 relative to the phases of the master ring oscillator 2002. In this manner the widths of the pulses in the n dim control signals $\phi_1$, $\phi_2$, ..., $\phi_n$ at the outputs of the S-PFD 2006-1, 2006-2, ..., 2006-n are changed in response to the modified power supply, forcing the duty cycles of each of the n dim control signals $\phi_1$, $\phi_2$, ..., $\phi_n$ to adapt to and track the duty cycle variations of the A>B signal.

Figure 22:
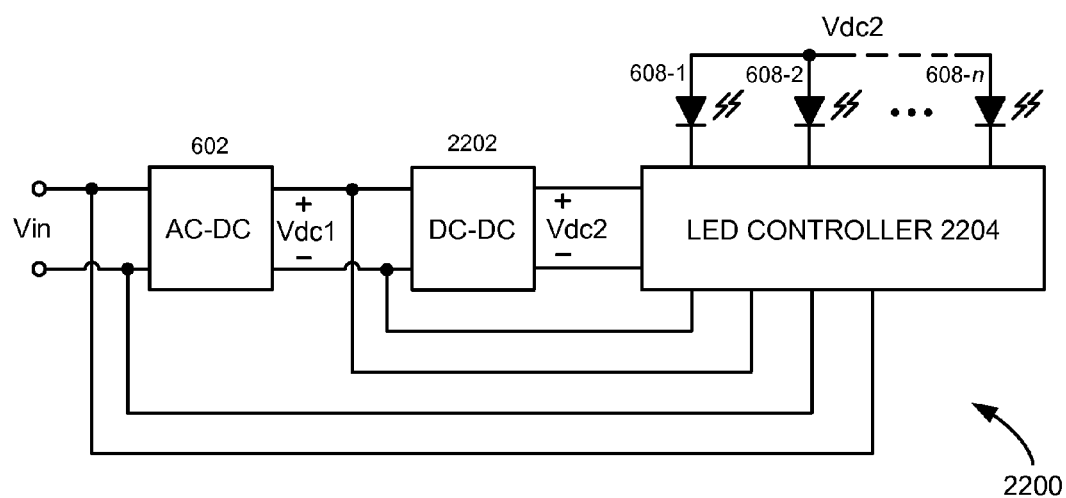
FIG. 22 is a drawing of an LED bulb, according to an alternative embodiment of the present invention, in which the LEDs of the LED bulb are connected in parallel.

In the exemplary embodiments of the invention described above, the LEDs 608-1, 608-2, ..., 608-n of the LED bulb 600 are individually powered by m separate power supplies provided by the divider 604. In an alternative embodiment, the LEDs 608-1, 608-2, ..., 608-n are connected in parallel and powered by a single power supply, as in the LED bulb 2200 shown in FIG. 22. The AC-DC converter 602 operates similar to as described above, the parallel connection of the LEDs 608-1, 608-2, ..., 608-n allowing for graceful degradation, similar to the LED bulb 600. A DC-DC converter 2202 downconverts the DC output voltage Vdc1 to a lower DC voltage Vdc2 for the LEDs 608-1, 608-2, ..., 608-n. Alternatively, if the AC-DC converter 602 is not duty-cycle-limited at low output voltages, it may possibly be configured to convert the AC input voltage Vin directly to Vdc2, i.e., without requiring assistance of the intermediate DC-DC converter 2202. The LED controller 2204 includes circuitry for collectively or individually controlling the dimming of the LEDs 608-1, 608-2, ..., 608-n, similar to the LED controller 606 described above, including support circuitry for controlling dimming in response to conventional TRIAC dimmer switches.

While various embodiments of the present invention have been described, they have been presented by way of example and not limitation. It will be apparent to persons skilled in the relevant art that various changes in form and detail may be made to the exemplary embodiments without departing from the true spirit and scope of the invention. Accordingly, the scope of the invention should not be limited by the specifics of the exemplary embodiments. Rather, the scope of the invention should be determined by the appended claims, including the full scope of equivalents to which such claims are entitled.

What is claimed is:

1. A lighting system, comprising:
one or more light-emitting devices; and
an alternating current to direct current (AC-DC) converter configured to convert an AC input voltage (Vin) to a DC output voltage (Vout) for use in powering said one or more light-emitting devices, said AC-DC converter including a plurality of switches and a control circuit including a first comparison circuit configured to compare the AC input voltage (Vin) or a scaled version thereof to the DC output voltage (Vout) and determine times when (Vin)>(Vout), a second comparison circuit including a second comparison circuit configured to compare the AC input voltage (Vin) to the negative of the DC output voltage (Vout) and determine times when (Vin)<(−Vout), and a switch control circuit configured to direct and control said plurality of switches to rectify the AC input voltage (Vin) based on the comparisons performed by said first and second comparison circuits.

2. The lighting system of claim 1, wherein said AC-DC converter is configured to operate as a buck converter during times said first comparison circuit determines that (Vin)>(Vout) and as an inverting buck converter during times said second comparison circuit determines that (Vin)<(−Vout).

3. The lighting system of claim 1, wherein said one or more light-emitting devices comprises a plurality of independently-powered light-emitting devices and said lighting system further comprises a power divider circuit configured to generate a plurality of DC power supplies from power provided by said AC-DC converter, said plurality of DC power supplies used to supply power to said plurality of independently-powered light-emitting devices.

4. The lighting system of claim 1, further comprising a dimmer circuit configured to generate a low-frequency digital dim control signal having a duty cycle that is dependent upon the magnitude of an analog dim control signal provided by an external dim control switch relative to said DC output voltage (Vout).

5. The lighting system of claim 4, wherein said dimmer circuit is further configured to upconvert said low-frequency digital dim control signal to a high-frequency digital dim control signal for controlling dimming of said one or more light-emitting devices, said high-frequency digital dim control signal having a duty cycle that is substantially the same as the duty cycle of said low-frequency digital dim control signal.

6. A power conversion and control system for an electrical load, comprising:
   an alternating current to direct current (AC-DC) converter not comprising a bridge circuit configured to convert AC power from an AC power source to DC power for powering an electrical load;
   control circuitry including a first comparison circuit configured to compare the magnitude of an AC input voltage from said AC power source or scaled version thereof to the DC output voltage produced at the output of said AC-DC converter and a second comparison circuit configured to compare the magnitude of said AC input voltage or scaled version thereof to the negative of said DC output voltage said control circuitry operable to produce an output signal having a duty cycle based on the comparisons performed by the first and second comparison circuits; and
   current control circuitry configured to control current passing through said electrical load according to the duty cycle of the output signal produced by said control circuitry.

* * * * *